3,351,683
PRODUCTION OF PHOSPHITE ESTERS
Chisung Wu, South Charleston, and Frank J. Welch, Charleston, W. Va., assignors to Union Carbide Corporation, a corporation of New York
No Drawing. Filed Jan. 28, 1965, Ser. No. 428,854
16 Claims. (Cl. 260—982)

The invention relates to the production of phosphorus compounds. In a particular aspect, the invention relates to a novel transesterification reaction wherein organic trithiophosphites are reacted with alcohols or with mercaptans to produce organic trithiophosphites or organic phosphites.

Organic phosphites and organic trithiophosphites are useful compositions. They find utility in many fields, such as extreme pressure additives for lubricants, as reaction intermediates for making insecticides, fungicides, and other biocides, as reactants in making various polymers such as polyesters, as flame-proofing and plasticizing additives for vinyl chloride and other resins, and the like. Many organic phosphites are produced by reacting phosphorus trichloride with an alcohol, and many organic trithiophosphites are produced by reacting a disulfide with elemental phosphorus or by reacting a mercaptan with phosphorus trichloride.

The present invention provides a process which comprises reacting an organic trithiophosphite with either an alcohol or a mercaptan to produce the phosphite or trithiophosphite of said alcohol or said mercaptan, respectively. A major advantage of the inventive process is that the product can be produced in good yield and is relatively easy to recover in pure form from the reaction mixture.

The novel process of the invention can be represented by the reaction:

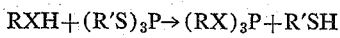

$$RXH + (R'S)_3P \rightarrow (RX)_3P + R'SH$$

wherein R represents an organic group, wherein X represents oxygen or sulfur, and wherein R' represents an organic group, provided that the boiling point of the compound represented by RXH is higher than the boiling point of the compound represented by R'SH.

The organic trithiophosphite reactant used in the process of the invention is ordinarily a trialkyl trithiophosphite wherein the alkyl has up to five carbon atoms, and preferably up to three carbon atoms. Illustrative trialkyl trithiophosphites include trimethyl trithiophosphite, triethyl trithiophosphite, tripropyl trithiophosphite, tributyl trithiophosphite, triamyl trithiophosphite, and the like. Trimethyl trithiophosphite is the most preferred trialkyl trithiophosphite. The trialkyl trithiophosphites are known compounds that can be produced by reacting a dialkyl disulfide with elemental phosphorus.

The second reactant that is employed in the process of the invention is an alcohol or a mercaptan. Among the alcohols that can be employed are the alkanols such as methanol, ethanol, 2-propanol, butanol, pentanol, hexanol, heptanol, octanol, nonanol, decanol, dodecanol, tetradecanol, hexadecanol, octadecanol, and the like. Cycloaliphatic alcohols can be employed, for instance, cyclohexanol, bicyclo[2.2.1]heptan-2-ol, and the like. Aromatic alcohols are useful, for example, phenol, cresol and other alkylphenols, xylenol, benzyl alcohol, naphthol, and the like. Also, alkylene oxide adducts of any of the above-listed alcohols can be employed.

The reactant RXH can also be a mercaptan. Illustrative mercaptans include ethyl mercaptan, propyl mercaptan, butyl mercaptan, benzyl mercaptan, thiophenol, hexamethylene dimercaptan, tetramethylene dimercaptan, 2-mercaptopropanol, 1,2-dimercaptopropanol, dithioresorcinol, and many other compounds.

Many other compounds can also be employed as the reactant RXH for use in the process of the invention. In general, the R variable in the reactant RXH will be a hydrocarbon group that is either saturated or which contains aromatic unsaturation, and which can contain one or more of the following functional groups: carbonyl, carbonyloxy, ether oxygen, nitro, thioether, and the like. Preferred reactants include alkanols of up to 18 carbon atoms, thioalkanols of from 2 to 18 carbon atoms, phenol, alkylphenols of up to 24 carbon atoms, thiophenol and alkylthiophenols of up to 24 carbon atoms, and the like.

The proportions of the reactants can vary widely. For instance, if it is desired to produce substantially pure $(RX)_3P$ from the reaction $RXH + (R'S)_3P \rightarrow (RX)_3P + R'SH$, then at least 3 moles of the alcohol or mercaptan reactant (i.e., RXH) is employed per mole of triorgano trithiophosphite. If is is desired to produce a mixed product, such as $(RX)(R'S)_2P$ or $(RX)_2(R'S)P$, then correspondingly less alcohol or mercaptan can be used. Normally at least 1 mole, and preferably at least 2 moles, of alcohol or mercaptan per mole of trithiophosphite will be used. A large excess of alcohol or mercaptan can be used if desired (e.g., up to 10 moles of alcohol or mercaptan per mole of triorgano trithiophosphite), but is not necessary. In most cases, from about 3 to about 5 moles of alcohol or mercaptan will be used per mole or triorgano trithiophosphite.

The process of the invention can be carried out over a wide range of reaction temperatures. For example, useful temperatures are found in the range of from about 20° to about 250° C., and preferably at elevated temperatures of from about 50° to about 230° C.

During the course of the reaction, R'SH will be produced. This material should be continuously removed by distillation. As was pointed out above, the triorgano trithiophosphite reactant must be selected such that the product R'SH has a lower boiling point than does the alcohol or the mercaptan reactant.

If desired, the reaction can be carried out in a solvent and in the presence of a catalyst, although neither is necessary. Useful solvents include acetone, methyl ethyl ketone, dimethyl sulfoxide, N,N-dimethylformamide, acetonitrile, dioxane, tetrahydrofuran, toluene, cyclohexane, nitrobenzene, and the like. Catalysts that can be used include bases such as alkali metal hydroxide and alkoxide, for example, sodium hydroxide, potassium hydroxide, sodium ethoxide, potassium methoxide, lithium hydroxide, and the like, alkali metal alkyls such as butyllithium, and the like, alkali metal mercaptides such as sodium methyl mercaptide, and the like. Other useful base catalysts include phenylsodium, vinylpotassium, Grignard reagents, calcium hydroxide, magnesium methoxide, sodium amide, calcium amide, lithium diphenylphosphite, sodium hydride, and the like.

The catalyst, when employed, is used in catalytic quantities, for instance, from about 0.1 to about 10 weight percent, based on weight of reactants. The amount of solvent used is not narrowly critical. For instance, the concentration of the reactants in the solvent can vary from about 10 to about 100 weight percent, based on weight of reaction mixture.

The reaction time is partly dependent upon factors such as temperature, nature of reactants, presence or absence of catalyst or solvent, and the like. The reaction is continued for a period of time sufficient to form the phosphite of the alcohol or mercaptan reactant. This period of time will usually be found within the range of from about 1 hour to 10 hours.

Conventional reaction equipment can be used for the process of the invention. For example, a reactor equipped with agitator, heat transfer means, distillation head, and the like can be used. The reaction equipment can be constructed out of stainless steel, glass, or other standard material.

The pressure under which the inventive process is carried out is not critical, and can be atmospheric, subatmospheric, or superatmospheric. It is desirable to conduct the process under an inert atmosphere, such as nitrogen.

The product by the process of the invention can be recovered by standard procedures. For example, excess reactant and solvent, if any, can be removed by distillation and the product recovered as a residue. Alternatively, fractional distillation can be used to recover the product.

The following examples illustrate the invention.

EXAMPLE 1

*Preparation of trimethyl trithiophosphite*

A stirred mixture of finely divided yellow phosphorus (1.55 g., 0.05 atom), dimethyl disulfide (7.05 g., 0.075 mol), 15 N potassium hydroxide (0.01 ml., 3 mol percent of phosphorus), and acetone (30 ml.) was heated to 40° C. under a nitrogen atmosphere. The heating mantle was removed when the temperature reached 40° C.; whereupon an exothermic reaction occurred, raising the temperature to 60° C. The reaction mixture was stirred until the temperature dropped to room temperature.

Alternatively, the base catalyst was added to the mixture of phosphorus, disulfide, and acetone at 60° C. The phosphorus disappeared in a few minutes, and the reaction mixture was cooled to room temperature after 10 minutes.

EXAMPLE 2

*Preparation of tri(dodecyl) trithiophosphite* n-Dodecyl mercaptan (30.3 g., 0.15 mol) was added to the reaction mixture obtained in Example 1. Evolution of methyl mercaptan occurred at room temperature. The reaction mixture was heated gradually to 150° C. in 1.5 hours, during which acetone was distilled out; then the reaction mixture was cooled to room temperature and evacuated (0.2 mm. Hg) for 2 hours. The residue (32 g., 100% of theory based on phosphorus) had an identical infrared spectrum as that of authentic tri(dodecyl) trithiophosphite.

EXAMPLE 3

*Preparation of tri-n-butyl trithiophosphite*

A mixture of redistilled trimethyl trithiophosphite (8.6 g., 0.05 mol), n-butyl mercaptan (18 g., 0.2 mol) and metallic sodium (50 mg.) is stirred for 1 hour at room temperature and a pressure of 450 mm. Hg. Then the reaction mixture is heated to about 100° C. to remove the unreacted n-butyl mercaptan, leaving about 14 g. (94%) of substantially pure tri-n-butyl trithiophosphite as a colorless liquid.

EXAMPLE 4

*Preparation of triphenyl trithiophosphite*

After the removal of acetone from the reaction mixture obtained by the procedure of Example 1, the residue was stirred with thiophenol (22 g., 0.2 mol) at 30° C. with a nitrogen stream passing over the liquid surface. There was only a trace of methyl mercaptan generated at this temperature. The reaction mixture was heated to 150°–160° C. for 3 hours under the nitrogen purge and then for 1.5 hours under 450 mm. Hg pressure. The reaction mixture was then heated to 160° C. at 1.0 mm. Hg pressure to remove the excess thiophenol. The residue (14 g., 78%) solidified upon standing, and had an infrared spectrum essentially identical with that of an authentic triphenyl trithiophosphite.

EXAMPLE 5

*Preparation of tri-n-butyl phosphite*

After the removal of acetone from the reaction mixture obtained by the procedure of Example 1, the residue was stirred with n-butanol (14.8 g., 0.2 mol). A stream of nitrogen was dispersed into the reaction mixture which was gradually heated to reflux. Methyl mercaptan was detected at 113° C. After 6 hours, the temperature reached 160° C., whereupon the reaction mixture was cooled. The product was purified by vacuum distillation, yielding 10.7 g. (87%) of tri-n-butyl phosphite, B.P. 83–84°/0.15 mm. Hg, $n$ 30/D 1.4313. The infrared spectrum was identical to that of an authentic sample.

EXAMPLE 6

*Preparation of tri-n-dodecyl phosphite*

According to the procedure of Example 5, n-dodecyl alcohol (37.2 g., 0.2 mol) was reacted with crude trimethyl trithiophosphite. Evolution of methyl mercaptan began at 150° C., and the methyl mercaptan was oxidized by iodine in a mixture of benzene and water. After heating the reaction mixture at 150–220° C. for 3.5 hours, about 80% of the theoretical amount of iodine was consumed. The reaction mixture was heated to 110° C. at 0.1 mm. Hg pressure for 0.5 hour and then heated to 150° C. (0.1 mm.) to remove any volatile material. The infrared spectrum of the residue (29.2 g., 99.7%) showed weak absorption bands for the hydroxyl group but no bands for the methylthio group.

EXAMPLE 7

*Preparation of triphenyl phosphite*

According to the procedure of Example 5, phenol (18.8 g., 0.2 mol) was reacted with crude trimethyl trithiophosphite at 130–150° C. for 1.5 hours. The product was purified by vacuum distillation, yielding 11.8 g. (79%) of triphenyl phosphite, B.P. 170° C./0.2 mm., $n$ 30/D 1.5862. The infrared spectrum was identical with that of an authentic sample.

EXAMPLE 8

*Preparation of triphenyl phosphite in the absence of catalyst*

A mixture of redistilled trimethyl trithiophosphite (8.6 g., 0.05 mol) and phenol (18.8 g., 0.2 mol) was heated at 130–150° C. and 450 mm. Hg pressure for 1.5 hours. Vacuum distillation yielded 8.1 g. (52%) of triphenyl phosphite, B.P. 165–180° C./0.2 mm. Hg.

EXAMPLE 9

*Preparation of tri-o-cresyl phosphite*

The procedure of Example 7 was repeated except that o-cresol was used and that the reaction mixture was heated at 170–200° C. for about 6 hours. About 11 g. (62%) of tri-o-cresyl phosphite was obtained as a clear liquid, B.P. 175° C./0.2 mm. Hg, $n$ 30/D 1.5713.

EXAMPLE 10

*Preparation of tri(nonylphenyl) phosphite*

About 44 g. (0.2 mol) of nonylphenol is reacted with 0.15 mol of trimethyl trithiophosphite under the conditions of Example 9. After the reaction, the excess nonylphenol is removed by vacuum distillation, leaving about 34 g. (70%) of substantially pure tri-nonylphenyl phosphite as a colorless liquid.

EXAMPLE 11

*Preparation of tris(nonylphenoxypolyethenoxyethyl) phosphite*

According to the procedure of Example 5, 102 g. (0.15 mol) of a condensation product of 1 mol of nonylphenol with 10.5 mols of ethylene oxide was reacted with 0.15 mol of crude trimethyl trithiophosphite at 200–210° C. for 8 hours, when no more methyl mercaptan was evolved. The reaction mixture was then evacuated to remove all volatile materials, leaving about 99 g. of a slightly viscous, tan, liquid product.

What is claimed is:

1. Process which comprises reacting a trialkyl trithiophosphite, wherein the alkyl has up to 5 carbon atoms, with a compound selected from the group consisting of alcohols, phenols and mercaptans, at a temperature and for a period of time sufficient to produce the phosphite of said compound and the alkyl mercaptan derived from said trialkyl trithiophosphite, provided that said alkyl mercaptan has a lower boiling point than said compound, and further provided that said alkyl mercaptan is continuously removed from the reaction mixture during the course of said process.

2. Process of claim 1 wherein said trialkyl trithiophosphite is trimethyl trithiophosphite.

3. Process of claim 1 wherein said process is carried out in the presence of a catalytic quantity of a base.

4. Process of claim 1 wherein said process is carried out in an inert, normally liquid reaction medium.

5. Process of claim 1 wherein said compound is an alkanol.

6. Process of claim 1 wherein said compound is a phenol.

7. Process of claim 1 wherein said compound is an alkyl mercaptan.

8. Process of claim 1 wherein said compound is dodecyl mercaptan.

9. Process of claim 1 wherein said compound is butyl mercaptan.

10. Process of claim 1 wherein said compound is thiophenol.

11. Process of claim 1 wherein said compound is butanol.

12. Process of claim 1 wherein said compound is dodecanol.

13. Process of claim 1 wherein said compound is phenol.

14. Process of claim 1 wherein said compound is cresol.

15. Process of claim 1 wherein said compound is nonylphenol.

16. Process of claim 1 wherein said compound is the ethylene oxide adduct of nonylphenol.

No references cited.

CHARLES B. PARKER, *Primary Examiner.*

A. H. SUTTO, *Assistant Examiner.*